R. S. FEND.
AUTOMOBILE.
APPLICATION FILED FEB. 11, 1918.
1,314,738.
Patented Sept. 2, 1919.
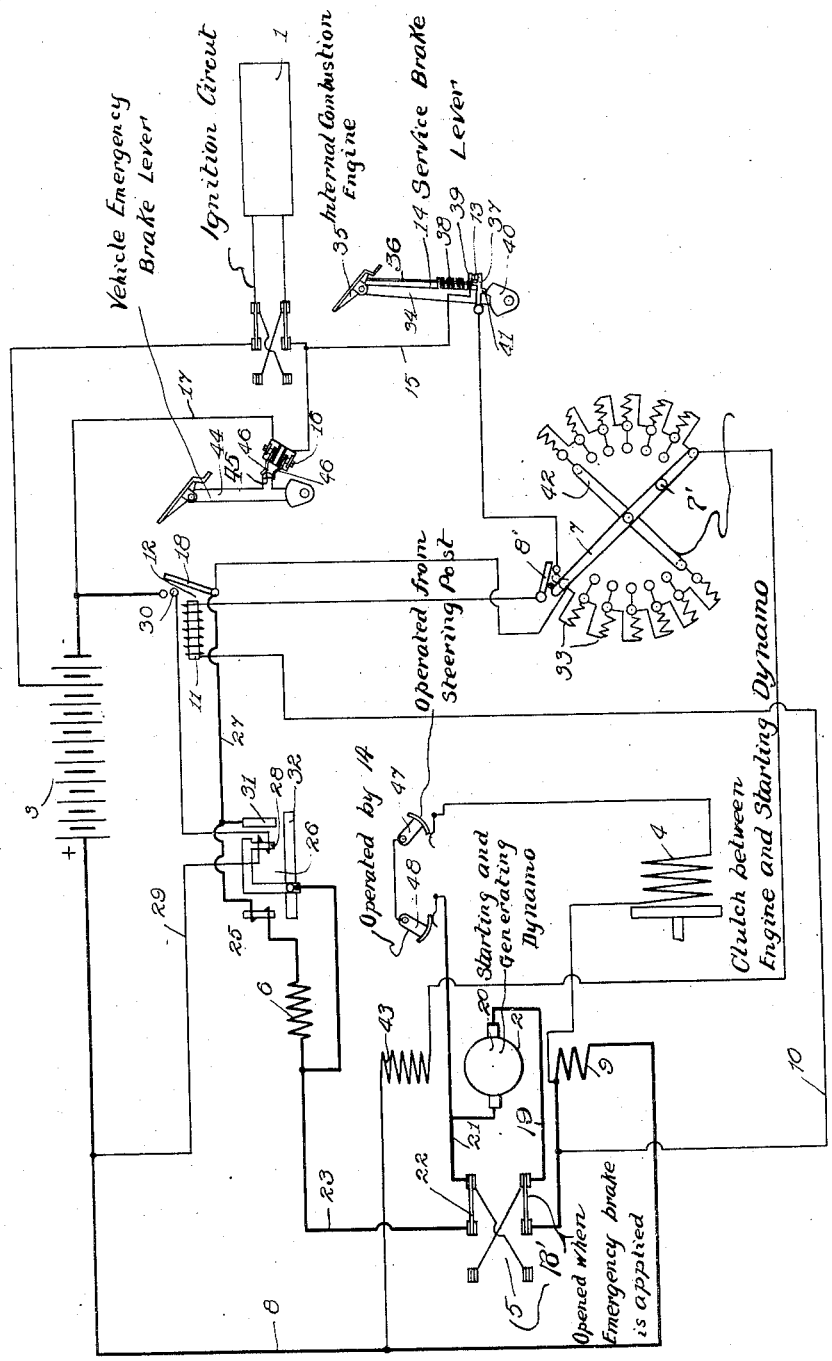
Witnesses:
Inventor
Roland S. Fend
By Williams, Bradbury
attys.

UNITED STATES PATENT OFFICE.

ROLAND S. FEND, OF CHICAGO, ILLINOIS, ASSIGNOR TO THE WOODS MOTOR VEHICLE COMPANY, OF CHICAGO, ILLINOIS, A CORPORATION OF ILLINOIS.

AUTOMOBILE.

1,314,738.          Specification of Letters Patent.      Patented Sept. 2, 1919.

Original application filed July 11, 1917, Serial No. 179,831. Divided and this application filed February 11, 1918. Serial No. 216,544.

*To all whom it may concern:*

Be it known that I, ROLAND S. FEND, a citizen of the United States, residing at Chicago, in the county of Cook and State of Illinois, have invented a certain new and useful Improvement in Automobiles, of which the following is a full, clear, concise, and exact description, reference being had to the accompanying drawings, forming a part of this specification.

This invention relates to improvements in automobiles and is especially concerned with improvements in automobiles of the so-called "dual-drive" type in which the power plant comprises an internal combustion engine, a dynamo, a storage battery and suitable means for properly controlling these elements.

This application is a division of my application Serial No. 179,831, filed July 11, 1917. The objects of this invention are, first, to provide means for automatically regulating the supply of current to the dynamo when it is started as a motor; second, to provide means whereby the dynamo when functioning as a motor can be started and stopped by the same foot that operates the brakes.

Other objects, adaptabilities and capabilities will appear as the description progresses, reference being had to the accompanying drawing in which is illustrated in a diagrammatical manner the internal combustion engine, dynamo, storage battery and means for controlling these elements.

In this drawing the reference character 1 indicates the internal combustion engine, the reference character 2 indicates as a whole the compound wound dynamo which, when functioning as a generator, supplies current to the storage battery 3 and which, when functioning as a motor, receives current from the same battery. The internal combustion engine 1 can be connected with and disconnected from the dynamo 2 by means of the electrically controlled clutch indicated by the reference character 4. Inasmuch as my present invention is not concerned with the details of the internal combustion engine nor the driving connection between the engine and the dynamo, no further description thereof will be given. The dynamo 2 is connected in series with the battery 3 by means of the circuit indicated in heavy lines in the drawing, this circuit including a reverse switch 5 and a resistance 6.

As described in my application referred to above, the dynamo may be started by means of a lever not shown in this drawing which has such connection with the brush-carrying member 7 of the shunt field rheostat that the latter can be rotated in a counter-clockwise movement. In this application a handle 7' is shown for operating the member 7. Upon the initial movement of this brush-carrying member the switch 8' closes, thereby completing a circuit from the battery 3 through the series field winding 9, the conductor 10, coil 11 of the main relay switch 12, switch 13 of the service brake 14, conductor 15, switch 16, conductor 17, back to the battery. When this circuit is completed the contact 18 of the main relay is closed and current flows from the battery through the conductor 8, series field 9, blade 18' of the reverse switch, conductor 19, armature 20, conductor 21, the blade 22 of the reverse switch, conductor 23, resistance 6, through the coil 25 of the differential relay 26, the conductor 27, contact 18 of the main relay to the battery. Since the armature of the dynamo is not rotating a very heavy current will flow therethrough. The resistance 6 is intended to prevent this current from becoming so excessive as to injure the windings of the dynamo. As the speed of the armature increases the current therethrough is cut down by the counter electromotive force developed therein, and means are provided for shunting the resistance 6 when the current reaches a certain predetermined value. This means comprises the differential relay 26, one solenoid 25 of which as described above is connected in series with the resistance 6. The other solenoid 28 is actuated by a shunt circuit 29 having a contact 30 which coacts with the contact 18 to close the circuit through the shunt 29 when the main relay is closed. When the dynamo 2 is first started by the closure of the main relay the current through the solenoid 25 is of such strength as to overbalance the effect of the solenoid 28, but as the speed and the counter electromotive force of the dynamo increases and the current therethrough correspondingly decreases a certain value is reached where the solenoid 28 overcomes the effect of the solenoid 25 and causes the contacts 31 and 32 to close, thereby shunting the resistance 6.

By shifting the brush-carrying member 7 over the contacts of the field rheostat the resistance elements 33 can be cut in or out, thereby regulating the speed of the vehicle as desired. I have, however, provided another means for controlling the speed of the vehicle when driven at low speeds, the structure of this means being such that the progress of the vehicle can be controlled by the foot which operates the brakes. The service brake 14 comprises a brake lever 34 which is connected through suitable means not shown with the brake mechanism of the automobile. This lever carries a foot-piece 35 which is pivotally mounted at the upper end thereof. A rod 36 is pivotally connected with the lower end of the foot-piece 35 and the lower end thereof is connected with a contact 37 of the electric switch 13 which is urged to its closed position by means of a spring 38. The contact 37 coacts with a contact 39 that is stationary with respect to the lever 34. When it is desired to drive the vehicle forward by successively energizing and deënergizing the motor and to prevent too rapid movement of the vehicle, as is sometimes desirable in crowded thoroughfares, the brake lever 34 is urged forwardly by the foot upon the foot-piece 35 to partially set the brakes and by alternately depressing and raising the lower portion of the foot-piece 35, the circuit of the main relay is alternately opened and closed, thereby causing a corresponding energization of the dynamo which at this time is functioning as a motor. Inasmuch as the brakes are partially set at the time the motor is energized, the forward movement thereof will be slow and completely under the control of the operator for the reason that the motor can be deënergized by simply depressing the heel of the foot resting upon the foot-piece 35.

In order to insure that the dynamo will not be energized until the brakes are partially set, I provide a cam 40 which coacts with a projecting lug 41 on the contact 37 to hold this contact in contacting relation with the contact 39 until the brake lever 34 has been moved forwardly sufficiently to partially set the brakes.

I also provide a connection between the brush-carrying arm 42 and the service brake lever for regulating the shunt field 43 without disturbing the brush-carrying arm 7, but inasmuch as this connection forms no part of my present invention the details thereof will not be referred to. The reference character 44 indicates an emergency brake lever which carries a conducting member 45 that coacts with the contacts 46 of the switch 16. When the emergency brake lever is urged forwardly the switch 16 is opened, thereby causing the main relay to open and deënergizing the motor. At the same time by means of a connection not shown herein but shown and described in my application above referred to, the contacts of the reverse switch 5 are also opened.

When it is desired to drive my improved automobile in a rearward direction, the direction of the current through the armature 20 of the dynamo is reversed by means of the reversing switch 5. It is necessary to provide means to insure that the internal combustion engine is disconnected from the dynamo before this reversal takes place. I have provided simple and effective means for producing this result by connecting one terminal of the electrically controlled friction clutch 4 with a common part of the reverse switch and the other terminal thereof with a part of the reverse switch which forms a part of but one of the circuits through the reverse switch. In the position of the reverse switch shown in the drawing the electrically controlled clutch is energized, being shunted as it is about the armature of the dynamo. In the reversed position of the switch the two terminals of the electrically controlled clutch will be brought to the same side of the dynamo with a conductor of but very small resistance between them and consequently insufficient current will be shunted through the clutch to hold the friction surfaces in driving relation and the internal combustion engine will therefore be disconnected from the dynamo. At 47 I have diagrammatically illustrated a switch which is closed by the movement of a member on the steering column, this member and the connections not being illustrated, as they form no part of my present invention. The switch 48 is connected with the service brake 14 so that when the latter is actuated to set the brakes the engine 1 will be disconnected from the dynamo and the propeller shaft which forms a continuation of the dynamo shaft. As these features form no part of this invention they are not described in detail.

Having thus described my invention, what I claim as new and desire to secure by United States Letters Patent is:

1. The combination with a storage battery of a dynamo having a shunt winding, a main circuit including a resistance for connecting said dynamo and battery in series, a second circuit shunting said resistance and including the contacts of a differential relay, one coil of which is connected in series with said main circuit, a circuit for the other coil of said differential relay connected to the battery between said dynamo and battery, a main relay for controlling the flow of current through said main and second circuits, a rheostat for the shunt circuit of said dynamo having a movable arm normally positioned to exclude all of the resistance from said shunt circuit, and a switch in the circuit of said main relay, the said switch being controlled by the initial movement of the rheostat arm from its normal position to close the circuit of said main relay.

2. The combination with a storage battery of a dynamo having a shunt winding, a main circuit including a resistance for connecting said dynamo and battery in series, a second circuit shunting said resistance and including the contacts of a differential relay, one coil of which is connected in series with said main circuit, a circuit for the other coil of said differential relay connected to the battery between said dynamo and battery, a main relay for controlling the flow of current through said main and second circuits, and a switch for closing said main circuit.

3. The combination with a storage battery of a dynamo having a shunt winding, a main circuit including a resistance for connecting said dynamo and battery in series, a second circuit shunting said resistance and including the contacts of a differential relay, one coil of which is connected in series with said main circuit, a circuit for the other coil of said differential relay, a main relay for controlling the flow of current through said main and second circuits, and a switch for closing said main circuit.

4. The combination with a source of current of a dynamo, a circuit including a resistance for connecting said source of current in series with said dynamo, a circuit for shunting said resistance, the said circuit including the contacts of a differential relay one coil of which is connected in said series circuit, a circuit for the other coil of said differential relay, a main relay for controlling said series and last named circuits, and means for opening and closing the circuit of said main relay.

5. The combination with a source of current of a dynamo having a shunt winding, series connections including a pair of relay contacts connecting said source of current and dynamo, a rheostat for the shunt field of said dynamo comprising a movable arm normally positioned to exclude all resistance from said shunt field circuit, and means actuated by the movement of said arm from its normal position for closing the circuit through said relay.

6. In a vehicle the combination of a dynamo, a source of current, series connections between said source of current and dynamo, a relay for opening and closing said series circuit, a brake lever, a foot-piece pivotally mounted on said brake lever, a switch for opening and closing the control circuit of said relay, actuating connections between said switch and foot-piece, and a cam for holding said connections inoperative until said brake lever is moved to a predetermined position.

7. In a vehicle the combination of a dynamo, a source of current, series connections between said source of current and dynamo, a relay for opening and closing said series circuit, a brake lever, a foot-piece pivotally mounted on said brake lever, a switch for opening and closing the control circuit of said relay, actuating connections between said switch and foot-piece, and means for holding said connections inoperative until said brake lever is moved to a predetermined position.

8. In a vehicle the combination of a dynamo and storage battery connected with said dynamo, a brake lever, a foot-piece mounted on said lever, and means connected with said foot-piece for making and breaking the connections between said dynamo and battery.

9. In a vehicle the combination of a storage battery, a dynamo connected with said battery, a brake lever, means on said brake lever for making and breaking the connection between said battery and dynamo, and means for positively controlling the last named means to maintain said connection closed until the brake lever has been moved to a predetermined position.

In witness whereof, I hereunto subscribe my name this 5th day of February, 1918.

ROLAND S. FEND.

Witnesses:
  L. J. STEPHENSON,
  JOHN W. STRATTAN.